US008124686B2

United States Patent
Loyen et al.

(10) Patent No.: US 8,124,686 B2
(45) Date of Patent: Feb. 28, 2012

(54) PROCESS FOR THE MANUFACTURE OF POLYAMIDE-12 POWDER WITH A HIGH MELTING POINT

(75) Inventors: Karine Loyen, Pont-Audemer (FR); Holger Senff, Serquigny (FR); Francois-Xavier Pauly, Le Neubourg (FR)

(73) Assignee: Arkema France, Colombes (FR)

( * ) Notice: Subject to any disclaimer, the term of this patent is extended or adjusted under 35 U.S.C. 154(b) by 501 days.

(21) Appl. No.: 11/070,611

(22) Filed: Mar. 2, 2005

(65) Prior Publication Data
US 2005/0197446 A1 Sep. 8, 2005

Related U.S. Application Data

(60) Provisional application No. 60/570,564, filed on May 13, 2004.

(30) Foreign Application Priority Data

Mar. 2, 2004 (FR) ..................................... 04 02125

(51) Int. Cl.
C08L 77/02 (2006.01)
C08G 69/04 (2006.01)
C08G 69/14 (2006.01)
C08G 69/16 (2006.01)
C08G 69/18 (2006.01)

(52) U.S. Cl. ........ 524/606; 528/312; 528/315; 528/320; 528/323; 528/326; 525/419; 525/420; 525/432

(58) Field of Classification Search .................. 524/492, 524/606; 528/312, 315, 320, 323, 326; 525/419, 525/420, 432
See application file for complete search history.

(56) References Cited

U.S. PATENT DOCUMENTS

| 3,879,354 | A | * | 4/1975 | Bonner | 528/481 |
| 4,214,065 | A | * | 7/1980 | Goebel, Jr. | 524/850 |
| 4,334,056 | A | | 6/1982 | Meyer et al. | |
| 4,414,362 | A | * | 11/1983 | Lenke et al. | 525/178 |
| 4,694,063 | A | | 9/1987 | Hilaire et al. | |
| 4,831,061 | A | * | 5/1989 | Hilaire et al. | 521/56 |
| 4,927,860 | A | * | 5/1990 | Hilaire et al. | 521/60 |
| 6,245,281 | B1 | | 6/2001 | Scholten et al. | |
| 2002/0082382 | A1 | * | 6/2002 | Le Crom et al. | 528/274 |
| 2004/0138344 | A1 | * | 7/2004 | Allen et al. | 523/326 |
| 2004/0138363 | A1 | * | 7/2004 | Baumann et al. | 524/413 |

* cited by examiner

*Primary Examiner* — Michael Pepitone
(74) *Attorney, Agent, or Firm* — Thomas F. Roland

(57) ABSTRACT

The present invention relates to a process for the preparation of polyamide-12 powder by anionic polymerization of lauryllactam in solution in a solvent of the lactam, the polyamide-12 powder being insoluble in this solvent, the polymerization being carried out:
  in the presence of a catalyst and of an activator;
  in the presence of a finely divided organic or inorganic filler, the proportion of this filler being less than or equal to 1.5 g per 1000 g of lauryllactam; and
  in the presence of an amide of formula $R_1$—NH—CO—$R_2$ in which $R_1$ can be replaced by an $R_3$—CO—NH— or $R_3$—O— radical and in which $R_1$, $R_2$ and $R_3$ denote an aryl, alkyl or cycloalkyl radical, the proportion of this compound being between 0.001 mol and 0.030 mol per 1000 g of lauryllactam.

14 Claims, No Drawings

PROCESS FOR THE MANUFACTURE OF POLYAMIDE-12 POWDER WITH A HIGH MELTING POINT

This application claims benefit, under U.S.C. §119(a) of French National Application Number 04.02125, filed Mar. 2, 2004; and also claims benefit, under U.S.C. §119(e) of U.S. provisional application 60/570,564, filed May 13, 2004.

FIELD OF THE INVENTION

The present invention relates to a process for the preparation of polyamide-12 powder with a high melting point. It is a synthesis of anionic type starting from lauryllactam. The powders obtained have a diameter of between 15 μm and 100 μm and a melting point of at least 180° C. These polyamide-12 powders are of use in numerous applications and in particular in the technology of polyamide powder sintering by melting caused by radiation, such as, for example, a laser beam (laser sintering), infrared radiation or UV radiation (UV curing).

The technology of the sintering of polyamide powders under a laser beam is used for the manufacture of objects in three dimensions, such as prototypes and models. A fine layer of polyamide powder is deposited on a horizontal plate held in a chamber heated to a temperature lying between the crystallization temperature Tc and the melting point Tm of the polyamide powder. The laser sinters powder particles at various points of the powder layer according to a geometry corresponding to the object, for example using a computer which has the shape of the object in its memory and which reconstructs this shape in the form of slices. The horizontal plate is subsequently lowered by a value corresponding to the thickness of a layer of powder (for example, between 0.05 and 2 mm and generally of the order of 0.1 mm) and then a new layer of powder is deposited and the laser sinters powder particles according to a geometry corresponding to this new slice of the object, and so on. The procedure is repeated until the complete object has been manufactured. A block of powder is obtained within which the object is present. The parts which have not been sintered have thus remained in the powder state. Subsequently, the combination is gently cooled and the object solidifies as soon as its temperature falls below the crystallization temperature Tc. After cooling is complete, the object is separated from the powder, which can be used in another operation.

It is recommended for the powder to have a difference Tm−Tc which is as large as possible in order to avoid deformation (or curling) phenomena during manufacture. This is because, at time $t_0$ immediately after the action of the laser beam, the temperature of the sample is greater than the crystallization temperature (Tc) of the powder but the introduction of a new colder powder layer causes the temperature of the component to rapidly fall below Tc and results in deformations.

Furthermore, an enthalpy of fusion (ΔHf) which is as high as possible is required in order to obtain good geometrical definition of the components manufactured. This is because, if the enthalpy of fusion is too low, the energy supplied by the laser is sufficient to cake, by thermal conduction, the powder particles close to the walls being constructed, and thus the geometrical precision of the component is no longer satisfactory.

It is clear that everything which has just been explained for the sintering of polyamide powders under a laser beam is valid whatever the radiation which brings about the melting.

U.S. Pat. No. 6,245,281 discloses the use of polyamide-12 (PA 12) powders in the technology of the sintering of powders under a laser beam. These powders are such that their Tm is between 185 and 189° C., their Tc is between 138 and 143° C. and their ΔHf has a value of 112±17 J/g. These powders are manufactured according to the process disclosed in U.S. Pat. No. 4,334,056. In the latter, PA-12 is first manufactured, is dissolved in ethanol between 130 and 150° C., and is then gently cooled below 125° C. with stirring. The PA-12 precipitates in the powder form.

U.S. Pat. No. 4,694,063 discloses the anionic polymerization of a lactam in a stirred reactor in a solvent in the presence of an N,N'-alkylenebisamide and of an organic or inorganic filler (for example, silica powder). The proportion of silica is from 1.7 to 17 g per 1000 g of lauryllactam. The reaction is carried out between 100 and 120° C. The polyamide-12 powder is collected by settling in the bottom of the reactor. A polyamide-12 powder with a melting point of 177±1° C. is obtained. This temperature is insufficient for the application in the manufacture of objects by the abovementioned sintering processes.

It has now been discovered that, by bringing the proportion of the organic or inorganic filler to less than or equal to 1.5 g per 1000 g of lauryllactam, the amount of amide of formula $R_1$—NH—CO—$R_2$ in which $R_1$ can be replaced by an $R_3$—CO—NH— or $R_3$—O— radical and in which $R_1$, $R_2$ and $R_3$ denote an aryl, alkyl or cycloalkyl radical (preferably, the amide is the N,N'-alkylenebisamide) being less than 0.030 mol per 1000 g of lauryllactam, a polyamide-12 powder with a melting point of at least 180° C. was obtained. Advantageously, the proportion of the organic or inorganic filler is between 0.05 and 1.5 g per 1000 g of lauryllactam. Preferably, it is between 0.2 and 1.5 g per 1000 g of lauryllactam, indeed even more advantageously still between 0.35 and 1.3 g per 1000 g of lauryllactam, indeed even more preferably still between 0.35 and 0.9 g per 1000 g of lauryllactam.

It is also advantageous for the polymerization to be initiated at a temperature at which the solvent is in a state of supersaturation with lactam.

The present invention relates to a process for the preparation of polyamide-12 powder by anionic polymerization of lauryllactam in solution in a solvent of the said lactam, the polyamide-12 powder being insoluble in this solvent, the said polymerization being carried out:

in the presence of a catalyst and of an activator;
in the presence of a finely divided organic or inorganic filler, the proportion of this filler being less than or equal to 1.5 g per 1000 g of lauryllactam; and
in the presence of an amide of formula $R_1$—NH—CO—$R_2$ in which $R_1$ can be replaced by an $R_3$—CO—NH—, an $R_3$—CO—NH—$CH_2CH_2$— or $R_3$—O— radical and in which $R_1$, $R_2$ and $R_3$ denote an aryl, alkyl or cycloalkyl radical, the proportion of this compound being between 0.001 mol and 0.030 mol per 1000 g of lauryllactam.

According to one embodiment, the finely divided organic or inorganic filler is silica.

According to one embodiment, the proportion of the finely divided organic or inorganic filler is between 0.05 and 1.5 g per 1000 g of lauryllactam. It can also be between 0.2 and 1.5 g per 1000 g of lauryllactam, indeed even between 0.35 and 1.3 g per 1000 g of lauryllactam, indeed even also between 0.35 and 0.9 g per 1000 g of lauryllactam.

According to one embodiment, the amide is chosen from ethylenebisstearamide (EBS) and ethylenebisoleamide (EBO).

According to one embodiment, the proportion of amide is between 0.002 mol and 0.022 mol per 1000 g of lauryllactam, indeed even between 0.005 mol and 0.020 mol per 1000 g of lauryllactam.

According to one embodiment, the polymerization is initiated at a temperature at which the solvent is in a state of supersaturation with lactam.

According to one embodiment, the polymerization is carried out in the presence of colouring pigments, of $TiO_2$, of glass fibre, of carbon fibre, of nanofill, of nanoclay, of carbon nanotube, of pigments for infrared absorption, of carbon black, of inorganic filler or of flame-retardant additive.

The invention also relates to a process for the manufacture of objects made of polyamide-12 by sintering of powders by melting caused by radiation, the powders having been obtained according to the process described above.

Furthermore, it relates to the use of PA-12 powder obtained by the preparation process described above to manufacture objects.

The melting point of the polyamide-12 powder is at least 180° C. and advantageously 183±1° C. (temperature of first warming measured by DSC, abbreviation of Differential Scanning Calorimetry, according to Standard ISO11357 at 20° C./min). The enthalpy of fusion (1st warming) is of the order of 114±4 J/g. The crystallization temperature is of the order of 135±1° C. The powder particles have a mean size of between 15 and 100 µm and advantageously between 25 and 60 µm.

The process can be carried out in a stirred reactor equipped with a device for heating by a jacket or a coil, with an emptying system, such as a bottom valve, and with a device for introducing the reactants flushed with dry nitrogen. The process can be carried out continuously or batchwise.

There are numerous advantages to this process. The powder is obtained directly without an additional stage of retreatment or of dissolution/precipitation. The size of the powder particles can be adjusted by the parameters of the process and narrow particle size distribution makes it possible to eliminate the phenomena of dust when the powder is used.

The flexibility of the Orgasol process disclosed in Patent EP 192 515 is retained, which is another advantage: on the one hand, the mean size of the powder can be adjusted by the conventional parameters of the process which are disclosed in U.S. Pat. No. 4,694,063 (see Table 1), incorporated herein by reference; on the other hand, the molecular masses can be adjusted while retaining the particle size distribution and the high melting point for the application (see Table 2).

Another advantage of this direct process is that it makes it possible to introduce, into the body of the material, additives which will contribute to improving the applicative properties of the powder. Mention may be made, for example, of pigments for colouring, $TiO_2$, fillers or pigments for infrared absorption, carbon black, inorganic fillers for reducing internal stresses and flame-retardant additives. It is also possible to add additives which make it possible to improve the mechanical properties (breaking stress and elongation at break) of the components obtained by melting. These fillers are, for example, glass fibres, carbon fibres, nanofillers, nanoclays and carbon nanotubes. The introduction of these fillers during the synthesis makes it possible to improve their dispersion and their effectiveness. The very narrow particle size distribution of these powders promotes their use in the manufacture of components by sintering under radiation (infrared, UV curing, and the like) because it results in very fine definition of the components and because it reduces the problems of formation of dust when the powder is used. Furthermore, the molecular mass of the polymer does not increase, not even after lengthy exposure to temperatures close to and below the melting point of the powder (see Table 3 below). This implies that the powder can be recycled a number of times without modification to its behaviour during the manufacture of components by sintering under radiation, the properties of the said components not varying also during the process. In addition, this process makes possible the manufacture of objects by powder sintering having good mechanical properties (see Table 2 below).

The present invention also relates to a process for the manufacture of objects made of polyamide-12 by powder sintering by melting by using radiation, the PA-12 powder having been obtained beforehand according to the abovementioned process. Mention may be made, as example of radiation, of that supplied by a laser beam (the process is then known as laser sintering). Mention may also be made of the process in which a mask is positioned between the layer of powder and the source of the radiation; the powder particles protected from the radiation by the mask are not sintered.

As regards the solvent, this is a solvent of the lactam. In contrast, the polyamide-12 powder is insoluble in this solvent. Such solvents are mentioned in U.S. Pat. No. 4,694,063. The solvent is advantageously a paraffinic hydrocarbon cut having a boiling range between 140 and 170° C.

As regards the catalyst, this is a base which is sufficiently strong to form a lactamate. Mention may be made, as examples of catalyst, of sodium, potassium, alkali metal hydrides and hydroxides, or alkali metal alkoxides, such as sodium methoxide or ethoxide.

As regards the activator, this term is used to denote any product capable of bringing about and/or accelerating polymerization. Mention may be made, as examples, of N-carboxyanilide lactams, isocyanates, carbodiimides, cyanimides, acyllactams, triazines, ureas, N-substituted imides or esters. The activator can be formed in situ, for example an acyllactam is obtained by adding an alkyl isocyanate to the lactam.

The ratio of the catalyst to the activator, in moles, can be between 0.2 and 2 and preferably between 0.8 and 1.2. The proportion of catalyst in the lactam can be between 0.1 and 5 mol, preferably between 0.3 and 1.5, per 100 mol of lactam.

As regards the finely divided organic or inorganic filler, its size can be between 0.01 µm and 30 µm and preferably between 0.01 and 10 µm. This filler can be added to the reactor after the introduction of the solvent. This filler can, for example, be silica. The proportion of this filler is advantageously between 0.35 and 0.9 g per 1000 g of lauryllactam. The lower the proportion of the organic or inorganic filler, the greater the size of the polyamide-12 powder.

As regards the amide, the copolymerization is carried out in the presence, generally, of amides of formula $R_1$—NH—CO—$R_2$ in which $R_1$ can be replaced by an $R_3$—CO—NH— or $R_3$—O— radical and in which $R_1$, $R_2$ and $R_3$ denote an aryl, alkyl or cycloalkyl radical and in particular of an N,N'-alkylenebisamide, such as ethylenebisstearamide (EBS) or ethylenebisoleamide (EBO), which are disclosed in U.S. Pat. No. 4,694,063.

As regards more particularly the amides of formula $R_1$—NH—CO—$R_2$ and the $R_1$, $R_2$ and $R_3$ radicals, examples of aryl radicals can be phenyl, para-tolyl or α-naphthyl. Examples of alkyls can be methyl, ethyl, n-propyl and n-butyl radicals and an example of a cycloalkyl radical is cyclohexyl. The preferred amides are those in which $R_1$ and $R_2$, which are identical or different, are phenyl or an alkyl having at most 5 carbon atoms, it being possible for $R_1$ to be replaced by $R_3$—O— and $R_3$ being an alkyl having at most 5 carbon atoms. Mention may be made, for example, of acetanilide, benzanilide, N-methyl acetamide, N-ethyl acetamide, N-methyl formamide and (4-ethoxyphenyl)acetamide. Other preferred amides are alkylenebisamides, such as ethylenebisstearamide (EBS) and ethylenebisoleamide (EBO). It would not be departing from the scope of the invention to carry out a polymerization in the presence of two or more amides. The lower the proportion of amide, the higher the molar mass of the powder. The higher the molar mass of the powder, the better the mechanical properties of the objects manufactured with these powders and in particular the better the elongation at break.

Advantageously, the process described above is carried out batchwise: the solvent and then, simultaneously or successively, the lactam, the amide, the divided filler, the catalyst and the activator are introduced. It is recommended to introduce first the solvent and the lactam (or the lactam in solution in the solvent), then to remove any trace of water and, when the medium is perfectly dry, to introduce the catalyst. Traces of water may be removed by azeotropic distillation. The activator is subsequently added. The divided filler can be introduced, for example, after the introduction of the lactam. The amide can be introduced, for example, after the introduction of the lactam. The process is carried out at atmospheric pressure and at a temperature of between 20° C. and the boiling point of the solvent. It is recommended for the solvent to be in a state of supersaturation with lactam, that is to say that it is recommended to carry out the process at a temperature below the temperature for crystallization of the lactam in the solvent. Above this temperature, the lactam is soluble; below, lactam seeds appear: it is this which makes it possible to increase the melting point of the polyamide-12 powder. This supersaturation temperature is determined using the usual techniques. The supersaturation of the solvent with lactam is also disclosed in U.S. Pat. No. 4,694,063. The duration of the reaction depends on the temperature and decreases when the temperature increases. It is usually between 1 h and 12 h. The reaction is total; all the lactam is consumed. On conclusion of the reaction, the solvent and the powder are separated by filtration or centrifuging and then the powder is dried.

According to an advantageous form of the invention, first the solvent and the lactam are introduced, separately or simultaneously, and then, after removing possible water, the catalyst is introduced. Subsequently, the activator is introduced, either continuously or portionwise. Although stages of the process are continuous, it is described as "batchwise" because it is broken down into cycles beginning with the introduction of the solvent into the reactor and terminating with the separation of the PA powder and the solvent.

In Examples 1, 2, 4 and 5 below, the purpose of which is to illustrate the invention without, however, limiting it, the tests were carried out in a reactor with a capacity of 5 liters equipped with a paddle stirrer, with a jacket in which the heating oil circulates, with a system for emptying via the bottom and with a lock chamber for introducing the reactants which is flushed with dry nitrogen. A device for azeotropic distillation under vacuum makes it possible to remove any trace of water from the reaction medium. Ex. 3 of U.S. Pat. No. 4,694,063 is a comparative example.

EXAMPLE 1

2800 ml of the solvent and then, successively, 899 g of dry lauryllactam, 14.4 g of EBS and 0.72 g of finely divided and dehydrated silica are introduced into the reactor maintained under nitrogen. After having begun stirring at 300 revolutions/min, the mixture is gradually heated up to 110° C. and 290 ml of solvent are distilled off under vacuum in order to azeotropically entrain any trace of water which might be present.

After returning to atmospheric pressure, the anionic catalyst, 1.44 g of sodium hydride with a purity of 60% in oil, is then rapidly introduced under nitrogen and stirring is increased to 350 revolutions/min under nitrogen at 110° C. for 30 minutes.

Subsequently, the temperature is brought back to 100° C. and the chosen activator, namely stearyl isocyanate, is continuously injected into the reaction medium using a small metering pump according to the following programme:
  10.7 g of isocyanate over 60 minutes;
  17.7 g of isocyanate over 132 minutes;
At the same time, the temperature is maintained at 100° C. during the first 60 minutes, it is then raised to 120° C. over 30 minutes and is maintained at 120° C. for a further 2 hours after the end of introduction of the isocyanate.

The polymerization is then terminated. After cooling to 80° C., separation by settling and drying, the polyamide-12 powder obtained exhibits the following characteristics:
  intrinsic viscosity: 0.99;
  particle size of between 14 and 40 μm with the mean diameter of the particles being 24 μm, without agglomerates;
and the reactor is virtually clean.

EXAMPLE 2

2800 ml of the solvent and then, successively, 899 g of dry lauryllactam, 7.2 g of EBS and 0.36 g of finely divided and dehydrated silica are introduced into the reactor maintained under nitrogen. After having begun stirring at 300 revolutions/min, the mixture is gradually heated up to 110° C. and 290 ml of solvent are distilled off under vacuum in order to azeotropically entrain any trace of water which might be present.

After returning to atmospheric pressure, the anionic catalyst, 1.44 g of sodium hydride with a purity of 60% in oil, is then rapidly introduced under nitrogen and stirring is increased to 350 revolutions/min under nitrogen at 110° C. for 30 minutes.

Subsequently, the temperature is brought back to 100.2° C. and the chosen activator, namely stearyl isocyanate, is continuously injected into the reaction medium using a small metering pump according to the following programme:
  10.7 g of isocyanate over 60 minutes;
  17.7 g of isocyanate over 132 minutes;
At the same time, the temperature is maintained at 100.2° C. during the first 60 minutes, it is then raised to 120° C. over 30 minutes and is maintained at 120° C. for a further 2 hours after the end of introduction of the isocyanate.

The polymerization is then terminated. After cooling to 80° C., separation by settling and drying, the polyamide-12 powder obtained exhibits the following characteristics:
  intrinsic viscosity: 1.12;
  particle size of between 3.5 and 170 μm with the mean diameter of the particles being 51 μm, without agglomerates;
and the reactor is virtually clean.

EXAMPLE 4

2800 ml of the solvent and then, successively, 899 g of dry lauryllactam, 4.95 g of EBS and 0.36 g of finely divided and dehydrated silica are introduced into the reactor maintained under nitrogen. After having begun stirring at 300 revolutions/min, the mixture is gradually heated up to 110° C. and 290 ml of solvent are distilled off under vacuum in order to azeotropically entrain any trace of water which might be present.

After returning to atmospheric pressure, the anionic catalyst, 1.79 g of sodium hydride with a purity of 60% in oil, is then rapidly introduced under nitrogen and stirring is increased to 400 revolutions/min under nitrogen at 1110° C. for 30 minutes. Subsequently, the temperature is brought back to 100.5° C. and the chosen activator, namely stearyl isocyanate, is continuously injected into the reaction medium using a small metering pump according to the following programme:
  3.6 g of isocyanate over 60 minutes;
  5.9 g of isocyanate over 132 minutes;
At the same time, the temperature is maintained at 100.5° C. during the first 60 minutes, it is then raised to 120° C. over 30 minutes and is maintained at 120° C. for a further 2 hours after the end of introduction of the isocyanate.

The polymerization is then terminated. After cooling to 80° C., separation by settling and drying, the polyamide-12 powder obtained exhibits the following characteristics:
- intrinsic viscosity: 1.48;
- particle size of between 15 and 120 μm with the mean diameter of the particles being 30 μm, without agglomerates;

and the reactor is virtually clean.

EXAMPLE 5

2800 ml of the solvent and then, successively, 899 g of dry lauryllactam, 9.0 g of EBS and 0.36 g of finely divided and dehydrated silica are introduced into the reactor maintained under nitrogen. After having begun stirring at 300 revolutions/min, the mixture is gradually heated up to 110° C. and 290 ml of solvent are distilled off under a vacuum of 50 mbar in order to azeotropically entrain any trace of water which might be present.

After returning to atmospheric pressure, the anionic catalyst, 1.44 g of sodium hydride with a purity of 60% in oil, is then rapidly introduced under nitrogen and stirring is increased to 400 revolutions/min under nitrogen at 110° C. for 30 minutes. Subsequently, the temperature is brought back to 100.4° C. and the chosen activator, namely stearyl isocyanate, is continuously injected into the reaction medium using a small metering pump according to the following programme:
- 10.7 g of isocyanate over 60 minutes;
- 17.7 g of isocyanate over 132 minutes;

At the same time, the temperature is maintained at 100.4° C. during the first 60 minutes, it is then raised to 120° C. over 30 minutes and is maintained at 120° C. for a further 2 hours after the end of introduction of the isocyanate.

The polymerization is then terminated. After cooling to 80° C., separation by settling and drying, the polyamide-12 powder obtained exhibits the following characteristics:
- intrinsic viscosity: 1.10;
- particle size of between 15 and 120 μm with the mean diameter of the particles being 40 μm, without agglomerates;

and the reactor is virtually clean.

The results are collated in Tables 1 to 3 below.

TABLE 1

| Powders | Melting Point, Tm, 1st warming (° C.) | Enthalpy of fusion, 1st warming (J/g) | Crystallization temperature Tc (° C.) | Molecular mass $\overline{Mw}$ (g/mol) | Mean size of the powder particles (μm) |
|---|---|---|---|---|---|
| Ex. 3 of U.S. Pat. No. 4,694,063 | 177 ± 1 | 110 | # | 26 000 | 30 |
| Example 5 | 184 ± 1 | 117 | 135 ± 1 | 25 500 | 40 |
| Example 4 | 183 ± 1 | 112 | 135 ± 1 | 47 500 | 55 |
| Example 1 | 183 ± 1 | 109 | 135 ± 1 | 23 000 | 24 |
| Example 2 | 184 ± 1 | 118 | 135 ± 1 | 30 500 | 51 |

TABLE 2

| | Ex. 3 of EP 192 515 | Example 4 powder |
|---|---|---|
| Breaking stress or maximum stress on component | 43-44 MPa | 40 MPa |
| Elongation at break | 8% | 30% |

The mechanical properties were measured according to Standard ISO 527-2, at a pull rate of 50 mm/min.

TABLE 3

| Powders | Molecular mass $\overline{Mw}$ (g/mol) | Molecular mass $\overline{Mw}$ after 8 h at 150° C. (g/mol) |
|---|---|---|
| Polyamide-12 (obtained by polycondensation) | 32 780 | 45 750 |
| Ex.3 of EP 192 515 | 25 150 | 22 550 |
| Example 1 | 23 000 | 21 500 |

The average molecular masses Mw were measured by steric exclusion chromatography. The analysis was carried out in benzyl alcohol at 130° C. The average molecular masses Mw are expressed as polyamide-12 equivalent.

What is claimed is:

1. A process for the preparation of polyamide-12 powder to obtain a polyamide-12 powder with a melting point of 183±1° C. comprising polymerizing a lauryllactam solvent solution by anionic polymerization, the polyamide-12 powder being insoluble in said solvent, the said polymerization being carried out:
   - in the presence of a catalyst and of an activator, wherein the ratio of the catalyst to the activator in moles is between 0.8 and 1.2;
   - in the presence of a finely divided organic or inorganic filler, the proportion of this filler being 0.35 to 0.9 g per 1000 g of lauryllactam; and
   - in the presence of an amide of formula $R_1$—NH—CO—$R_2$ in which $R_1$ can be an $R_3$—CO—NH—, an $R_3$—CO—NH—$CH_2CH_2$— or $R_3$—O— radical and in which $R_1$, $R_2$ and $R_3$ denote an aryl, alkyl or cycloalkyl radical, the proportion of this compound being between 0.001 mol and 0.030 mol per 1000 g of lauryllactam wherein said powder has a mean diameter of between 15 microns and 100 microns; a melting point of 183±1° C.; has a crystallization temperature of 135±1° C.; and wherein the proportion of catalyst to lauryllactam is from 0.1 to 5 mol per 100 mol of lauryllactam.

2. The process according to claim 1, in which the finely divided organic or inorganic filler is silica.

3. The process according to claim 1, in which the amide is selected from the group consisting of ethylenebisstearamide (EBS) and ethylenebisoleamide (EBO).

4. The process according to claim 1, in which the proportion of amide is between 0.002 mol and 0.022 mol per 1000 g of lauryllactam.

5. The process according to claim 4, in which the proportion of amide is between 0.005 mol and 0.020 mol per 1000 g of lauryllactam.

6. The process according to claim 1, in which the polymerization is initiated at a temperature at which the solvent is in a state of supersaturation with lauryllactam.

7. The process according to claim 1, characterized in that the said polymerization is carried out in the presence of colouring pigments, of $TiO_2$, of glass fibre, of carbon fibre, of nanofiller, of nanoclay, of carbon nanotube, of pigments for infrared absorption, of carbon black, of inorganic filler or of flame-retardant additive.

8. A process for the manufacture of objects made of polyamide-12 by sintering of powders by melting caused by radiation, the powders having been obtained according to the process of claim 1.

9. An object comprising the polyamide-12 powder obtained by the preparation process according to claim 1.

10. The process of claim 8, wherein said radiation is a laser beam, infrared radiation or UV radiation.

11. A polyamide-12 powder formed by the process of claim 1.

12. The polyamide-12 powder according to claim 11, wherein the powder particles have a mean size of between 25 and 60 μm.

13. The polyamide-12 powder according to claim 11, wherein the enthalpy of fusion (1st warming) is 114±4 J/g.

14. The polyamide-12 powder according to claim 11, wherein said powder can be recycled a large number of times without modification to its behaviour.

* * * * *